United States Patent
Chiang et al.

(10) Patent No.: US 9,760,755 B1
(45) Date of Patent: Sep. 12, 2017

(54) FINGERPRINT MATCHING METHODS AND DEVICE

(71) Applicant: Egis Technology Inc., Taipei (TW)

(72) Inventors: Yuan-Lin Chiang, Taipei (TW); Yu-Chun Cheng, Taipei (TW)

(73) Assignee: Egis Technology Inc., Taipei (TW)

( * ) Notice: Subject to any disclaimer, the term of this patent is extended or adjusted under 35 U.S.C. 154(b) by 130 days.

(21) Appl. No.: 14/505,721

(22) Filed: Oct. 3, 2014

(51) Int. Cl.
G06K 9/00 (2006.01)
G06K 9/62 (2006.01)
G06F 17/30 (2006.01)

(52) U.S. Cl.
CPC ... *G06K 9/00087* (2013.01); *G06F 17/30244* (2013.01); *G06K 9/00013* (2013.01); *G06K 9/6202* (2013.01)

(58) Field of Classification Search
None
See application file for complete search history.

(56) References Cited

U.S. PATENT DOCUMENTS

| | | | | |
|---|---|---|---|---|
| 6,031,942 A * | 2/2000 | Nakayama | G06K 9/00087 | 382/124 |
| 6,075,876 A * | 6/2000 | Draganoff | G06K 9/00067 | 382/124 |
| 6,289,114 B1 | 9/2001 | Mainguet | | |
| 6,459,804 B2 | 10/2002 | Mainguet | | |
| 7,116,806 B2 * | 10/2006 | Werthiem | G06K 9/00073 | 382/124 |
| 7,194,115 B2 * | 3/2007 | Uchida | G06K 9/00026 | 340/5.53 |
| 7,627,150 B2 * | 12/2009 | Abiko | G06K 9/00026 | 345/629 |
| 7,685,432 B2 * | 3/2010 | Mochizuki | G06K 9/00 | 713/182 |
| 7,760,920 B2 * | 7/2010 | Abiko | G06K 9/00026 | 382/115 |
| 7,812,860 B2 * | 10/2010 | King | G06F 17/30011 | 348/210.99 |
| 7,903,847 B2 * | 3/2011 | Higuchi | A61B 5/1172 | 382/115 |
| 8,792,683 B2 * | 7/2014 | Ramrattan | H04L 63/0861 | 382/115 |
| 2003/0126448 A1 * | 7/2003 | Russo | G06K 9/00026 | 713/186 |
| 2003/0194114 A1 * | 10/2003 | Mitsuyu | G06K 9/00026 | 382/124 |
| 2005/0025357 A1 * | 2/2005 | Landwehr | A01M 1/026 | 382/170 |
| 2005/0238211 A1 * | 10/2005 | Du | G06K 9/00026 | 382/124 |
| 2006/0023921 A1 * | 2/2006 | Saitoh | G06K 9/3275 | 382/115 |

(Continued)

*Primary Examiner* — Michelle Hausmann (57) ABSTRACT

A fingerprint matching device and method are provided. The fingerprint matching method applied to a swipe sensor includes: obtaining first swiping dataset; generating registered dataset from the first swiping dataset, wherein the registered dataset includes a first number of frames; extracting second swiping dataset, wherein the second swiping dataset includes a second number of frames and the second number is greater than the first number; and comparing the frames of the second swiping dataset with the registered dataset.

19 Claims, 7 Drawing Sheets

(56) References Cited

U.S. PATENT DOCUMENTS

| | | | | |
|---|---|---|---|---|
| 2010/0002914 A1* | 1/2010 | Abiko | ................ | G06K 9/00026 |
| | | | | 382/124 |
| 2010/0166250 A1* | 7/2010 | Zhang | ............... | G06F 17/30781 |
| | | | | 382/100 |
| 2013/0015946 A1* | 1/2013 | Lau | .......................... | G07C 9/00 |
| | | | | 340/5.2 |
| 2013/0329967 A1* | 12/2013 | Abiko | ................ | G06K 9/00026 |
| | | | | 382/115 |
| 2014/0003677 A1* | 1/2014 | Han | .................. | G06K 9/00006 |
| | | | | 382/124 |
| 2015/0110340 A1* | 4/2015 | Harron | ............... | G06K 9/00744 |
| | | | | 382/100 |
| 2015/0286873 A1* | 10/2015 | Davis | ........................ | G06F 3/00 |
| | | | | 382/103 |

\* cited by examiner

| 18 | 10(3) | 13(0) | ······ | 165(4) | 150(-) |

| G1 | e0 | e1 | e2 | e3 | e4 | e5 |
|----|----|----|----|----|----|----|
| E2 | R(e0) | R(e1) | | | | |
| E1 | | | R(e2) | R(e3) | | |
| E0 | | | | | R(e4) | R(e5) |

FINGERPRINT MATCHING METHODS AND DEVICE

BACKGROUND OF THE INVENTION

Field of the Invention

The invention generally relates to fingerprint matching technology, and more particularly, to fingerprint matching technology for comparing frames of a registered dataset with frames of a swiping dataset.

Description of the Related Art

In recent years, with the development of technology and because codes and cards are stolen or lost easily, more and more attention has been placed on fingerprint matching (recognition) technology. Fingerprints are unique, invariant and can be multiple (ten fingers can be recognized). In addition, fingerprints are obtained easily. Therefore, security and convenience may be increased because of fingerprint matching, and financial security and confidential data can be better protected.

Traditional fingerprint matching technology may comprise two methods, a swiping method and pressing method. In the swiping method, the frames which are obtained by a swiping action are reconstructed to generate a fingerprint image firstly and then the image is compared with other fingerprint images for fingerprint matching. However, when the frames are reconstructed to generate a fingerprint image, the fingerprint image may be distorted easily, as a result, matching failure may occur. Therefore, how to avoid distortion when frames are reconstructed to become a fingerprint image, and how to promote efficiency in fingerprint matching are subjects worthy of discussion.

BRIEF SUMMARY OF THE INVENTION

A fingerprint matching method and apparatus are provided to overcome the above mentioned problems.

An embodiment of the invention provides a fingerprint matching method. The fingerprint matching method is applied to a swipe sensor. The fingerprint matching method comprises: obtaining a first swiping dataset; generating a registered dataset from the first swiping dataset, wherein the registered dataset comprises a first number of frames; obtaining a second swiping dataset, wherein the second swiping dataset comprises a second number of frames and the second number is greater than the first number; and comparing the frames of the second swiping dataset with those of the registered dataset.

An embodiment of the invention provides a fingerprint matching device. The fingerprint matching device comprises a fingerprint sensor which is configured to generate a first swiping dataset and a second swiping dataset, and a processing unit which is configured to generate a registered dataset from the first swiping dataset and compare the frames of the second swiping dataset with those of the registered dataset, wherein the registered dataset includes a first number of frames, the second swiping dataset includes a second number of frames and the second number is greater than the first number.

Other aspects and features of the invention will become apparent to those with ordinary skill in the art upon review of the following descriptions of specific embodiments of communication transmission methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
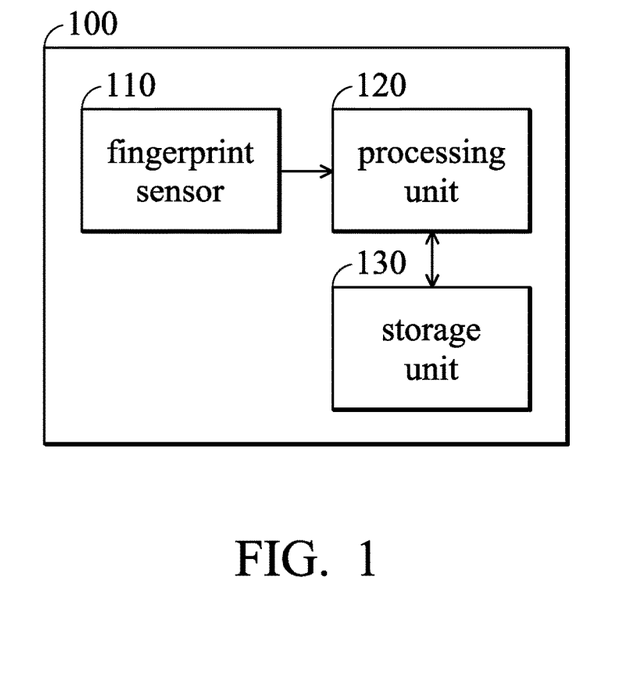
FIG. 1 is a fingerprint matching device 100 according to an embodiment of the invention.

FIG. 1 is a fingerprint matching device 100 according to an embodiment of the invention. As shown in FIG. 1, the fingerprint matching device 100 comprises a fingerprint sensor 110, a processing unit 120 and a storage unit 130. FIG. 1 presents a simplified block diagram in which only the elements relevant to the invention are shown. However, the invention should not be limited to what is shown in FIG. 1.

In an embodiment of the invention, the fingerprint matching device 100 comprises a swipe sensor which senses the fingerprint when a user swipes his or her finger over the surface of the swipe sensor. The swipe sensor senses and generates a plurality of frames of fingerprint, each of them covering a portion of the fingerprint, while the user's finger is sweeping over the sensor. In other words, after the swiping, the fingerprint matching device 100 will obtain a swiping dataset (called first swiping dataset), wherein the first swiping dataset comprises a plurality of frames, and the size of each frame is specified according to the area size of the fingerprint sensor 110. Then, for fingerprint matching, the processing unit 120 generates a registered dataset from the first swiping dataset. The registered dataset comprises a first number of frames. In an embodiment of the invention, the processing unit 120 stores the registered dataset to the storage unit 130.

In an embodiment of the invention, after receiving the first swiping dataset from the fingerprint sensor 110, the processing unit 120 sequentially compares the characteristics of frames of the first swiping dataset. When the difference value between the characteristics of two frames is greater than a first threshold, the processing unit 120 may select the later frame as one frame of the registered dataset and compare characteristics of the selected frame with characteristics of the following frames. For example, if the first swiping dataset comprises 200 frames, the processing unit 120 may select the first frame and compare it with other frames in order. That is to say, the processing unit 120 may select the first frame as one frame of the registered dataset, and the first frame is regarded as the comparison base. If the difference value is not greater than the first threshold until the first frame is compared with the fifth frame, the processing unit 120 may select the fifth frame as one frame of the registered dataset, and take the fifth frame for comparison with other frames in sequence. Namely, the fifth frame is regarded as the next comparison base. Similarly, the processing unit 120 may keep on comparing and selecting until all frames of the first swiping dataset are compared. In addition, the difference value between the characteristics of the second frame (also the third frame, and the fourth frame) and those of the first frame (comparison base) is smaller than the first threshold. Namely, compared to the first frame, the frames (e.g. the 2nd-4th frames) do not have significant characteristics. Therefore, the processing unit 120 may delete the second, third and fourth frames.

Figure 2:
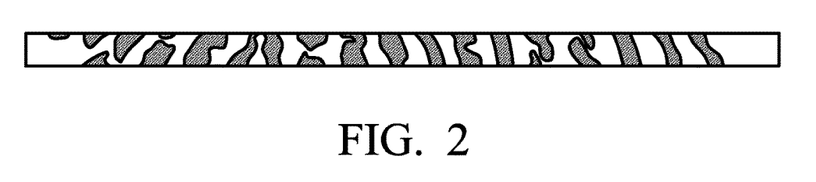
FIG. 2 is a schematic diagram illustrating one frame according to an embodiment of the invention.
Figure 3:
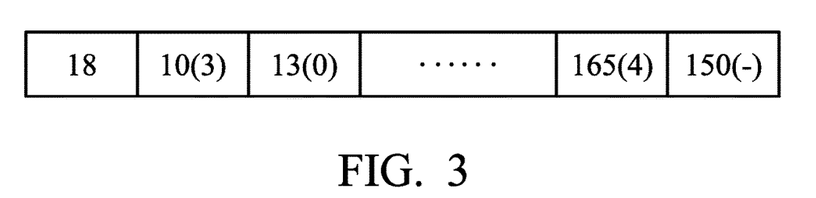
FIG. 3 is a schematic diagram illustrating an entry indicating characteristics values of a frame according to an embodiment of the invention.

In an embodiment of the invention, the characteristics values of each frame comprise the number of the fingerprint lines, the trends of the fingerprint lines and the distance between two neighboring fingerprint lines. The number of the fingerprint lines may be regarded as the number of the ridges in a frame. The trends of the fingerprint lines may be regarded as the trends of the ridges and the trends are specified in unit of degrees. For example, taking 360 degrees as the basis, the relative angles of ridges are regarded as the trends of the ridges. The distance between the fingerprint lines is the distance between two neighboring ridges, and the distance is specified in unit of pixels. FIG. 2 is schematic diagram illustrating one frame according to an embodiment of the invention. As shown in FIG. 2, after the processing unit 120 analyzes the frame, the processing unit 120 may obtain the characteristics of the frame. The characteristics of the frame are shown as follow, 18{10(3), 13(0), 25(3), 25(3), 30(4), 35(2), 170(3), 163(4), 5(3), 180(3), 175(3), 0(4), 185(5), 175(7), 170(7), 180(6), 165(4), 150(-)}, wherein 18 is the number of the fingerprint lines, 10, 13, 25 . . . 160, 150 indicate trends of the fingerprint lines, and (3), (0), (3) . . . , (6), (4), (-) indicate distance between the fingerprint lines. FIG. 3 is schematic diagram illustrating an entry of characteristics values of a frame according to an embodiment of the invention. As shown in FIG. 3, when the processing unit 120 obtains the characteristics values of a frame, the processing unit 120 may generate an entry corresponding to the frame, and the entry is indicated as $E_i$ to mean the entry of the ith frame.

When the user swipes his or her finger on the fingerprint matching device 100 again after the processing unit 120 selects the registered dataset, the fingerprint sensor 110 may obtain another swiping dataset (called second swiping dataset), wherein the second swiping dataset comprises a second number of frames. In an embodiment of the invention, the first number of frames of the registered dataset is less than the second number of frames of the second swiping dataset.

When the processing unit 120 receives the second swiping dataset, the processing unit 120 may compare the second swiping dataset with the registered dataset to determine whether the fingerprint matching is successful. In an embodiment of the invention, the processing unit 120 compares the second swiping dataset with the registered dataset by an algorithm. In an embodiment of the invention, for the algorithmic method, the processing unit 120 may calculate an Euclidean-distance between the frames of the second swiping dataset and the registered dataset, and a offset value between the frames of the second swiping dataset and the registered dataset. The offset value is caused because that when the user swipes his or her finger the second time, compared to the first time, the user's finger may be shifted to left or right during the second time of swiping. Therefore, a offset value may exist between the registered dataset and the second swiping dataset. Note that, in the embodiment, the Euclidean-distance and offset value are adopted to compare the frames, but it is to be understood that the invention is not limited thereto. The processing unit 120 may also adopt other algorithms to compare the frames.

Figure 4A:
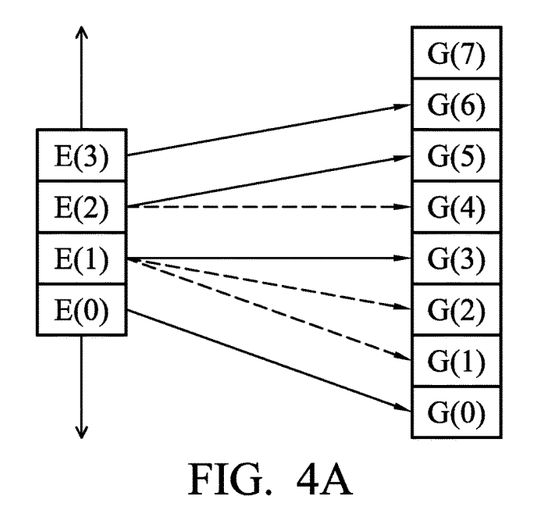
FIG. 4A is a schematic diagram illustrating fingerprint-matching between the second swiping dataset and the registered dataset according to an embodiment of the invention.

After the processing unit 120 calculates the Euclidean-distance and the offset value between the frames of the second swiping dataset and the registered dataset, the processing unit 120 may determine whether the Euclidean-distance between the frames of the second swiping dataset and the registered dataset is smaller than a second threshold, and whether the offset value between the frames of the second swiping dataset and the registered dataset is smaller than a third threshold. If the Euclidean-distance between the frames of the second swiping dataset and the registered dataset is smaller than a second threshold, and the offset value between the frames of the second swiping dataset and the registered dataset is smaller than a third threshold, the processing unit 120 may determine that the two frames are matching. In other words, when the conditions on the Euclidean-distance and offset value are satisfied, the processing unit 120 will determine that the two frames are matching. In addition, the matched frame of the second swiping dataset and the frames which were prior to the matched frame of the second swiping dataset will not be compared with other frames of the registered dataset. Namely, the next frame of the registered dataset will be compared with the frames following the matched frame. FIG. 4A will illustrate an example of the embodiment.

Figure 4B:
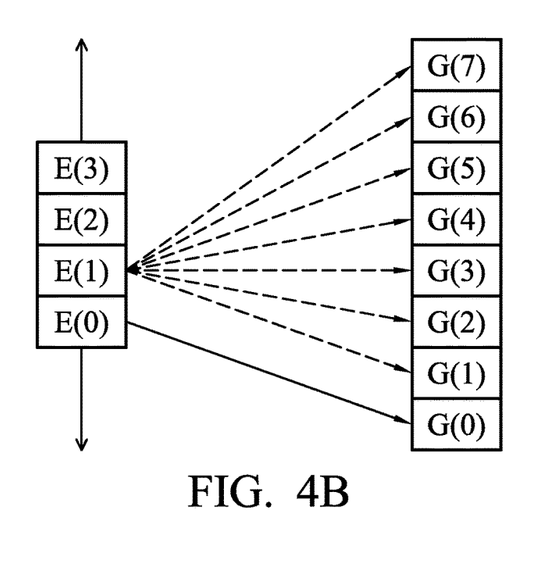
FIG. 4B is a schematic diagram illustrating fingerprint-matching between the second swiping dataset and the registered dataset according to another embodiment of the invention.

FIG. 4A is a schematic diagram illustrating fingerprint-matching for the second swiping dataset and the registered dataset according to an embodiment of the invention. As shown in FIGS. 4A-4B, the registered dataset comprises 4 frames, the second swiping dataset comprises 7 frames, and the set of entries corresponding to the frames of the registered dataset is indicated as {E(0), E(1), E(2), E(3)} and the set of entries corresponding to the frames of the second swiping dataset is indicated as {G(0), G(1), G(2), G(3) . . . G(6)}, wherein the solid line indicates the matched frame, and the dotted line indicates the non-matched frame. As shown in FIG. 4A, the processing unit 120 may compare the first frame (E(0)) of the registered dataset with the first frame (G(0)) of the second swiping dataset, wherein the compared result is indicated as S(E(0), G(0)). When the compared result S(E(0), G(0)) is greater than a compared threshold (e.g. Euclidean-distance and offset value), the frames E(0) and G(0) are determined as matching, namely, the Euclidean-distance between E(0) and G(0) is smaller than the second threshold and the offset value between E(0) and G(0) is smaller than the third threshold. Then, E(1) will be compared with the frames of the second swiping dataset after E(0) is matched. Because the G(0) matches E(0), E(1) will be compared with the frames of the second swiping dataset following the frame G(1). Then, as shown in FIGS. 4A, E(1) has not been matched until compared with G(3). Therefore, E(2) will be compared with the frames of the second swiping dataset following G(4). When all frames of the registered dataset are matched to the corresponding frames of the second swiping dataset, the processing unit 120 may determine that the fingerprint matching is successful.

In another embodiment of the invention, if in the fingerprint matching process, one particular frame of the registered dataset cannot be matched, the processing unit 120 will compare the next frame of the registered dataset with the frames of the second swiping dataset until all of the frames of the registered dataset have been compared with the frames of the second swiping dataset, and the processing unit 120 may determine whether the number of the matched frames of the registered dataset is greater than a fourth threshold. If the matched frames of the registered dataset is greater than a fourth threshold, the processing unit 120 may determine that fingerprint matching is successful; and if the matched frames of the registered dataset is smaller than a fourth threshold, the processing unit 120 may determine that fingerprint matching has failed. FIG. 4B will illustrate an example for the embodiment of the invention.

FIG. 4B is a schematic diagram illustrating fingerprint-matching for the second swiping dataset and the registered dataset according to another embodiment of the invention. As shown in FIG. 4B, the processing unit 120 will compare the E(1) with the remaining frames of the second swiping dataset after the E(0) is matched. When the processing unit 120 compares the E(1) with the remaining frames of the second swiping dataset and the G(1)~G(7) of the second swiping dataset cannot be matched with the E(1), the processing unit 120 may determine that the E(1) cannot be matched or the E(1) is frame noise. Then the processing unit 120 will compare E(2) with the remaining frames of the second swiping dataset until all frames of the registered dataset have been compared with the frames of the second swiping dataset. Then, the processing unit 120 may determine whether the number of the matched frames of the registered dataset is greater than a fourth threshold. If the number of the matched frames of the registered dataset is greater than a fourth threshold, the processing unit 120 may determine that the fingerprint matching is successful. Because the processing unit 120 may determine whether the number of the matched frames of the registered dataset is greater than a fourth threshold, the processing unit 120 will not determine that the fingerprint matching for the second swiping dataset has failed when one frame or a few frames of the registered dataset cannot be matched.

Figure 5:
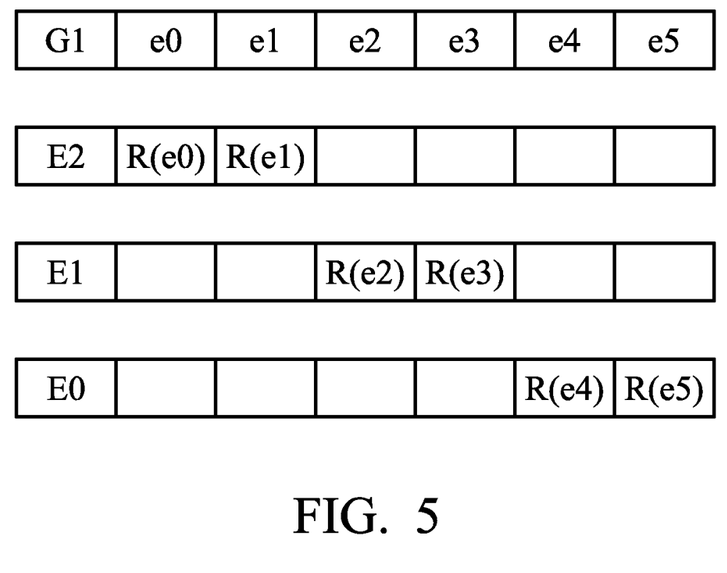
FIG. 5 is a schematic diagram illustrating rotation between the second swiping dataset and the registered dataset according to an embodiment of the invention.

FIG. 5 is a schematic diagram illustrating rotation between the second swiping dataset and the registered dataset according to an embodiment of the invention. When the user swipes his or her finger over the fingerprint sensor 110 for the second swiping dataset along a different angle from that where the user swipes for the registered dataset, a rotation will exist between the second swiping dataset and the registered dataset. The processing unit 120 will compare the frames of the second swiping dataset with the frames of the registered dataset, and determine whether at least a part of the frames of the second swiping dataset matches at least a part of the frames of the registered dataset. For example, as shown in FIG. 5, when a rotation angle exists between the frame G1 of the second swiping dataset and the frames of the registered dataset, the processing unit 120 will divide each of the frames (E1, E2, E3) of the registered dataset into three parts and compare the frame G1 of the second swiping dataset with the frames of the registered dataset. If at least a part of the frame G1 of the second swiping dataset matches at least a part of at least one of the frames of the registered dataset, the processing unit 120 will determine that the frame G1 is matched. For example, if e0 and e1 of the frame G1 matches R(e0) and R(e1) of the frame E2, the processing unit 120 will determine that the frame G1 matches the frame E2. Note that, in the embodiment, each of the frames of the registered dataset is divided into three parts only for specifying an embodiment. It is to be understood that the invention is not limited thereto. Each of the frames of the registered dataset can also be divided into two parts, four parts, or other numbers of parts.

Note that in the embodiments of the invention, the first threshold the second threshold, the third threshold and the fourth threshold may be set and adjusted according to different requirements and situations.

Figure 6:
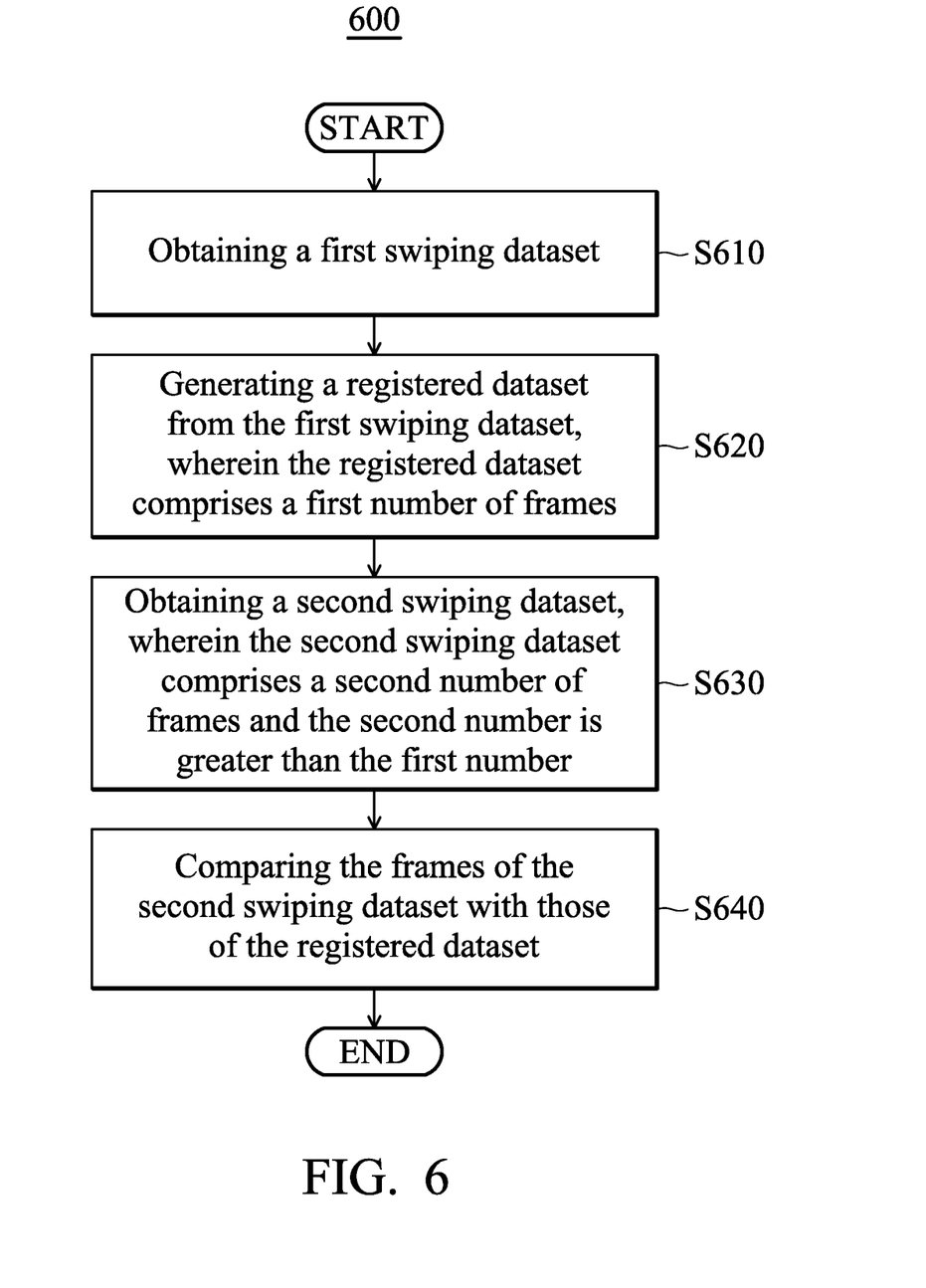
FIG. 6 is a flow chart illustrating the fingerprint matching method according to an embodiment of the invention.

FIG. 6 is a flow chart illustrating the fingerprint matching method according to an embodiment of the invention. The fingerprint matching method is applied to the fingerprint matching device 100. As shown in FIG. 6, in step S610, a first swiping dataset is obtained by the fingerprint matching device 100. In step S620, a registered dataset is selected from the first swiping dataset by the fingerprint matching device 100, wherein the registered dataset comprises a first number of frames. In step S630, a second swiping dataset is obtained by the fingerprint matching device 100, wherein the second swiping dataset comprises a second number of frames, and the second number is greater than the first number. In step S640, the frames of the second swiping dataset are compared with the frames of the registered dataset by the fingerprint matching device 100.

Figure 7:
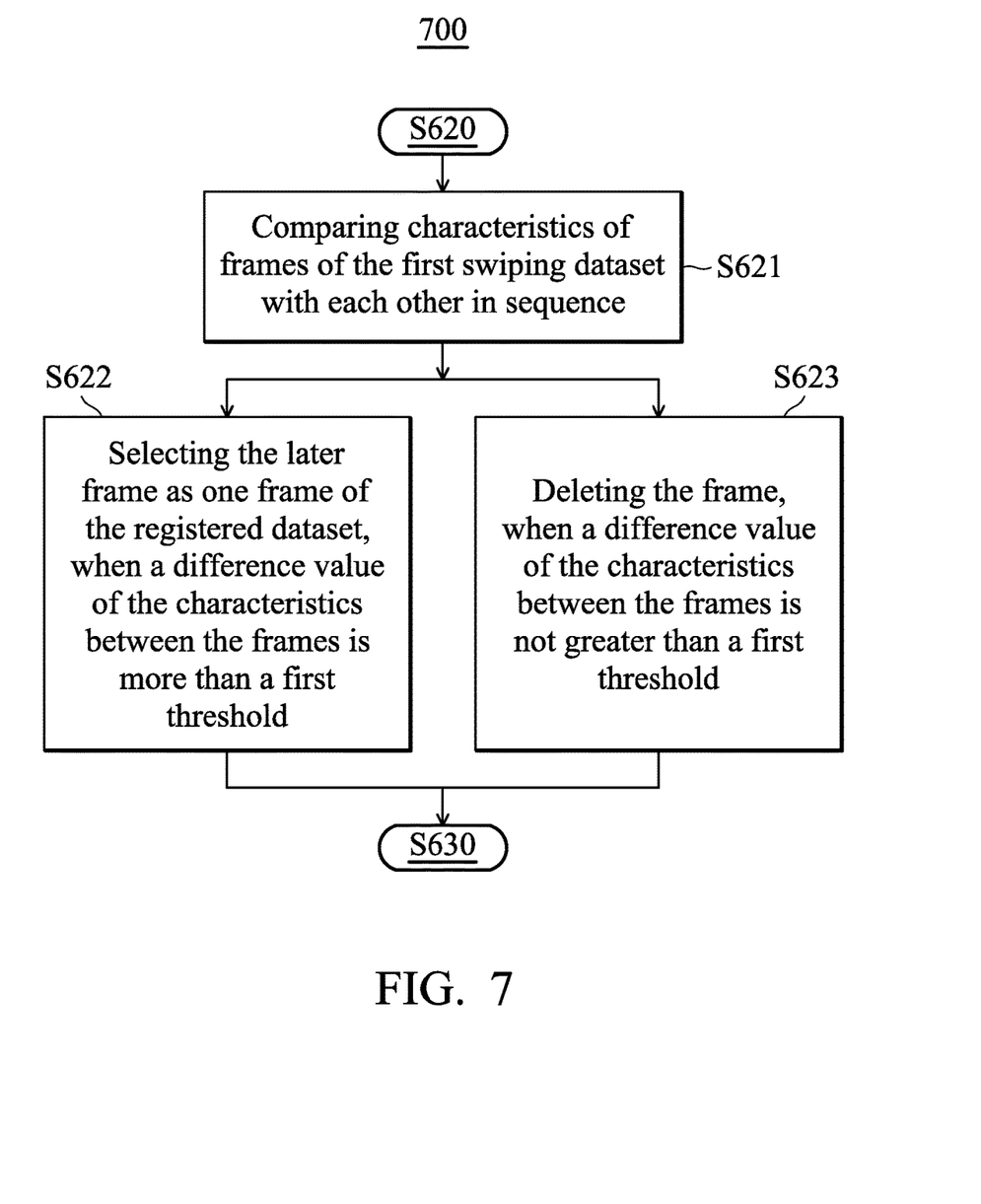
FIG. 7 is a flow chart illustrating step S620 according to an embodiment of the invention.

FIG. 7 is a flow chart illustrating step S620 according to an embodiment of the invention. The flow is applied to the fingerprint matching device 100. As shown in FIG. 7, the step S620 comprises the following steps. In step S621, the characteristics of the frames of the first swiping dataset are compared in sequence by the fingerprint matching device 100. In step S622, when the difference value of the characteristics between the frames is greater than a first threshold, the later frame will be selected as one frame of the registered dataset by the fingerprint matching device 100. In step S623, when the difference value of the characteristics between the frames is smaller than the first threshold, the later frame will be deleted by the fingerprint matching device 100.

Figure 8:
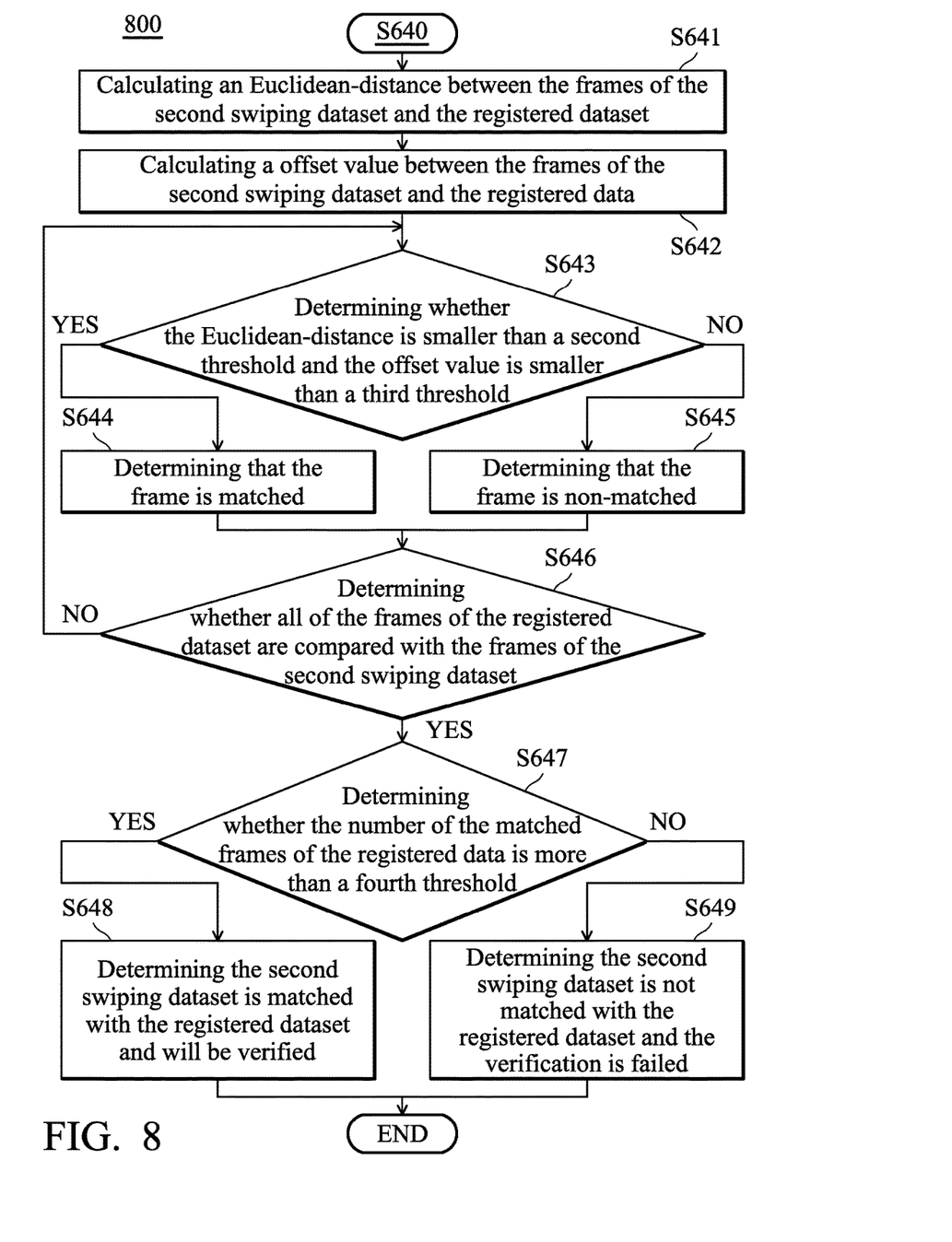
FIG. 8 is a flow chart illustrating step S640 according to an embodiment of the invention.

FIG. 8 is a flow chart illustrating step S640 according to an embodiment of the invention. The flow is applied to the fingerprint matching device 100. As shown in FIG. 8, the step S640 comprises the following steps. In step S641, an Euclidean-distance between the frames of the second swiping dataset and the registered dataset is calculated by the processing unit 120. In step S642, a offset value between the frames of the second swiping dataset and the registered dataset is calculated by the processing unit 120. In step S643, whether the Euclidean-distance between the frames of the second swiping dataset and the registered dataset is smaller than a second threshold is determined by the processing unit 120, and whether the offset value between frames of the second swiping dataset and the registered dataset is smaller than a third threshold is determined by the processing unit 120. In step S644, if the Euclidean-distance is smaller than the second threshold and the offset value is smaller than the third threshold, it is determined that the frame is matched by the processing unit 120, and the matched frame of the second swiping dataset will not be compared with the other remaining frames of the registered dataset. In step S645, if the Euclidean-distance is greater than the second threshold and/or the shift is greater than the third threshold, it is determined that the frame is not matched by the processing unit 120. In step S646, it is determined whether all of the frames of the registered dataset have been compared with the frames of the second swiping dataset. If some frames of the registered dataset have not been compared with the frames of the second swiping dataset, go to step S643. If all of the frames of the registered dataset have been compared with the frames of the second swiping dataset, go to step S647. In step S647, it is determined whether the number of the matched frames of the registered dataset is greater than a fourth threshold by the processing unit 120. In step S648, when the number of the matched frames of the registered dataset is greater than a fourth threshold, the second swiping dataset is matched with the registered dataset and will be verified. In step S649, when the number of the matched frames of the registered dataset is not greater than a fourth threshold, the second swiping dataset is not matched with the registered dataset and the verification is failed.

In an embodiment of the invention, the fingerprint matching method further comprises a step where when there is a rotation angle between the second swiping dataset and the registered dataset, the frames of the second swiping dataset will be compared with the frames of the registered dataset by the fingerprint matching device 100 to determine whether at least a part of the frames of the second swiping dataset matches at least a part of the frames of the registered dataset.

According to the fingerprint matching method of the invention, the fingerprint matching device 100 will not reconstruct or combine the frames of the second swiping dataset to generate a composite image of the fingerprint before fingerprint matching. The fingerprint matching device 100 only needs to compare the frames of the second swiping dataset with the frames of the registered dataset directly. Therefore, the distortion problem of reconstructing or combining the frames of the second swiping dataset will be prevented. In addition, the efficiency of the fingerprint matching is also improved.

In addition, the fingerprint matching method of the invention also mitigates frame noise and the rotation problem. The fingerprint matching device 100 will not directly determine that fingerprint matching has failed when the frame noise and rotation problem occurs. Therefore, the success rate of fingerprint matching will be improved.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

Reference throughout this specification to "one embodiment" or "an embodiment" means that a particular feature, structure, or characteristic described in connection with the embodiment is included in at least one embodiment of the invention, but do not denote that they are present in every embodiment. Thus, the appearances of the phrases "in one embodiment" or "in an embodiment" in various places throughout this specification are not necessarily referring to the same embodiment of the invention.

The above paragraphs describe many aspects. Obviously, the teaching of the invention can be accomplished by many methods, and any specific configurations or functions in the disclosed embodiments only present a representative condition. Those who are skilled in this technology can understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A fingerprint matching method, applied for a swipe sensor, comprising the steps of:
    obtaining, by a fingerprint sensor, a first swiping dataset comprising a plurality of frames sensed when a finger is swiped over a surface of the fingerprint sensor, wherein each of the frames of the first swiping dataset covers a portion of the fingerprint;
    generating, by a processing unit, a registered dataset from the first swiping dataset, wherein the registered dataset comprises a first number of frames selected from the first swiping dataset, and wherein the registered dataset is generated from the first swiping dataset by performing the steps of:
        comparing, by the processing unit, the characteristics of the frames of the first swiping dataset with each other in sequence; and
        selecting, by the processing unit, a later frame as one frame of the registered dataset when a difference value of the characteristics between the later frame and its preceding frame is greater than a first threshold;
    obtaining, by the fingerprint sensor, a second swiping dataset comprising a second number of frames sensed when the finger is swiped over the surface of the fingerprint sensor, wherein each of the frames of the second swiping dataset covers a portion of the fingerprint and the second number is greater than the first number;
    comparing, by the processing unit, the frames of the second swiping dataset with those of the registered dataset in sequence; and
    verifying, by the processing unit, the second swiping dataset when the second swiping dataset is determined to match the registered dataset according to the result of the comparing step.

2. The fingerprint matching method of claim 1, wherein each of the characteristics comprises the number of fingerprint lines, trends of the fingerprint lines and distances between the two neighboring fingerprint lines.

3. The fingerprint matching method of claim 1, wherein the comparing step further comprises the steps of:
    calculating, by the processing unit, an Euclidean-distance between the frames of the second swiping dataset and the registered dataset;
    calculating, by the processing unit, an offset value between the frames of the second swiping dataset and the registered dataset; and determining, by the processing unit, whether the Euclidean-distance is smaller than a second threshold and the offset value is smaller than a third threshold.

4. The fingerprint matching method of claim 3, wherein the determining step further comprises the step of:
   determining, by the processing unit, that the frame is matched if the Euclidean-distance is smaller than the second threshold and the offset value is smaller than the third threshold.

5. The fingerprint matching method of claim 4, wherein the matched frame of the second swiping dataset and the prior frames to the matched frame of the second swiping dataset will not be compared with other frames which have not been compared in the registered dataset.

6. The fingerprint matching method of claim 3, wherein the determining step further comprises the step of:
   determining, by the processing unit, that the frame is not matched if the Euclidean-distance is greater than the second threshold or the shift is greater than the third threshold.

7. The fingerprint matching method of claim 4, further comprising:
   determining, by the processing unit, whether the number of the matched frames of the registered dataset is greater than a fourth threshold when all of the frames of the registered dataset are compared with the frames of the second swiping dataset; and
   determining, by the processing unit, that the second swiping dataset is matched with the registered dataset and will be verified when the number of the matched frames of the registered dataset is more than the fourth threshold.

8. The fingerprint matching method of claim 1, wherein the comparing step further comprises the step of:
   comparing, by the processing unit, the frames of the second swiping dataset with the frames of the registered dataset and determining whether at least a part of the frames of the second swiping dataset matches at least a part of the frames of the registered dataset when there is a rotation angle between the second swiping dataset and the registered dataset.

9. A fingerprint matching device, comprising:
   a fingerprint sensor, configured to generate a first swiping dataset comprising a plurality of frames sensed when a finger is swiped over a surface of the fingerprint sensor, wherein each of the frames of the first swiping dataset covers a portion of the fingerprint, and to generate a second swiping dataset comprising a second number of frames sensed when the finger is swiped over the surface of the fingerprint sensor, wherein each of the frames of the second swiping dataset covers a portion of the fingerprint; and
   a processing unit, configured to generate a registered dataset from the first swiping dataset, compare the frames of the second swiping dataset with those of the registered dataset in sequence, and verify the second swiping dataset when the second swiping dataset is determined to match the registered dataset according to the comparing result, wherein the registered dataset includes a first number of frames selected from the first swiping dataset, and the second number is more than the first number;
   wherein the processing unit generates the registered dataset from the first swiping dataset by comparing the characteristics of the frames of the first swiping dataset with each other in sequence and selecting a later frame as one frame of the registered dataset when a difference value of the characteristics between the later frame and its preceding frame is greater than a first threshold.

10. The fingerprint matching device of claim 9, wherein each of the characteristics comprises the number of fingerprint lines, trends of the fingerprint lines and distances between the two neighboring fingerprint lines.

11. The fingerprint matching device of claim 9, wherein the processing unit calculates an Euclidean-distance between the frames of the second swiping dataset and the registered dataset, calculates an offset value between the frames of the second swiping dataset and the registered dataset and determines whether the Euclidean-distance is smaller than a second threshold and the offset value is smaller than a third threshold.

12. The fingerprint matching device of claim 11, wherein the processing unit determines that the frame is matched if the Euclidean-distance is smaller than the second threshold and the offset value is smaller than the third threshold.

13. The fingerprint matching device of claim 12, wherein the matched frame of the second swiping dataset and the prior frames to the matched frame of the second swiping dataset will not be compared with other frames which have not been compared in the registered dataset.

14. The fingerprint matching device of claim 12, wherein the processing unit determines that the frame is not matched if the Euclidean-distance is greater than the second threshold or the shift is greater than the third threshold.

15. The fingerprint matching device of claim 12, wherein the processing unit determines the number of the matched frames of the registered dataset is greater than a fourth threshold when all the frames of the registered dataset are compared with the frames of the second swiping dataset and when the number of the matched frames of the registered dataset is greater than the fourth threshold, determines that the second swiping dataset is matched with the registered dataset and will be verified.

16. The fingerprint matching device of claim 9, wherein the processing unit compares the frames of the second swiping dataset with the frames of the registered dataset and determines whether at least a part of the frames of the second swiping dataset matches at least a part of the frames of the registered dataset when there is a rotation angle between the second swiping dataset and the registered dataset.

17. The fingerprint matching device of claim 9, further comprising:
   a storage unit, configured to store the registered dataset.

18. The fingerprint matching method of claim 1, wherein the step of comparing the frames of the second swiping dataset with those of the registered dataset in sequence comprises the steps of:
   comparing a first frame of the registered dataset with frames of the second swiping dataset in sequence until a matching frame is determined; and
   successively comparing each subsequent frame of the registered dataset with frames of the second swiping dataset in sequence until a matching frame is determined, wherein each successive comparison begins comparing with a frame of the second swiping dataset following the matching frame determined in the previous comparison.

19. The fingerprint matching device of claim 9, wherein the processing unit is configured to compare the frames of the second swiping dataset with those of the registered dataset by comparing a first frame of the registered dataset with frames of the second swiping dataset in sequence until a matching frame is determined, and successively comparing each subsequent frame of the registered dataset with frames of the second swiping dataset in sequence until a matching frame is determined, wherein each successive comparison begins comparing with a frame of the second swiping dataset following the matching frame determined in the previous comparison.

\* \* \* \* \*